United States Patent
Uemura et al.

(10) Patent No.: US 11,433,712 B2
(45) Date of Patent: Sep. 6, 2022

(54) PNEUMATIC TIRE

(71) Applicant: The Yokohama Rubber Co., LTD., Tokyo (JP)

(72) Inventors: Takanori Uemura, Hiratsuka (JP); Takayuki Shiraishi, Hiratsuka (JP); Hiraku Kouda, Hiratsuka (JP); Tatsuro Shinzawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 156 days.

(21) Appl. No.: 16/328,675

(22) PCT Filed: Aug. 30, 2017

(86) PCT No.: PCT/JP2017/031205
§ 371 (c)(1),
(2) Date: Feb. 26, 2019

(87) PCT Pub. No.: WO2018/043580
PCT Pub. Date: Mar. 8, 2018

(65) Prior Publication Data
US 2019/0193474 A1    Jun. 27, 2019

(30) Foreign Application Priority Data

Aug. 31, 2016    (JP) .............................. JP2016-169032

(51) Int. Cl.
*B60C 11/12*      (2006.01)
*B60C 11/03*      (2006.01)
*B60C 11/13*      (2006.01)

(52) U.S. Cl.
CPC .......... *B60C 11/1281* (2013.01); *B60C 11/03* (2013.01); *B60C 11/0302* (2013.01);
(Continued)

(58) Field of Classification Search
CPC . B60C 11/1281; B60C 11/03; B60C 11/0302; B60C 11/12; B60C 11/1204;
(Continued)

(56) References Cited

U.S. PATENT DOCUMENTS

D370,439 S  *  6/1996  Feider .......................... D12/588
6,405,772 B1   6/2002  Suzuki et al.
(Continued)

FOREIGN PATENT DOCUMENTS

DE    10 2012 109 712        4/2014
EP              213452    *   3/1987   ............. B60C 11/12
(Continued)

OTHER PUBLICATIONS

Nakajima, JP-2005075213-A Machine Translation (Year: 2005).*
(Continued)

*Primary Examiner* — Steven D Maki
(74) *Attorney, Agent, or Firm* — Thorpe North & Western

(57) ABSTRACT

Provided is a pneumatic tire. A sipe is formed, on each of a leading side edge and a trailing side edge, with a chamfered portion shorter than a sipe length of a sipe, a non-chamfered region in which no other chamfered portion is present is provided in a part facing each of the chamfered portions, at least one end of the sipe communicates with the auxiliary groove, one end of the chamfered portion adjacent to the auxiliary groove in the rib communicates with the auxiliary groove, a maximum depth×(mm) of the sipe and a maximum depth y (mm) of the chamfered portion satisfy a relationship x×0.1≤y≤x×0.3+1.0, and a sipe width W of the sipe is constant in a range from an end positioned in the radial direction inside the chamfered portion to a groove bottom of the sipe.

7 Claims, 11 Drawing Sheets

(52) U.S. Cl.
CPC .......... *B60C 11/12* (2013.01); *B60C 11/1204* (2013.01); *B60C 11/1236* (2013.01); *B60C 11/1259* (2013.01); *B60C 11/13* (2013.01); *B60C 2011/1213* (2013.01)

(58) Field of Classification Search
CPC . B60C 11/1236; B60C 11/1259; B60C 11/13; B60C 11/1213; B60C 11/1263; B60C 11/1272; B60C 11/1218; B60C 11/1254; B60C 2011/1254; B60C 2011/1213
See application file for complete search history.

(56) References Cited

U.S. PATENT DOCUMENTS

| | | | |
|---|---|---|---|
| 2002/0112800 A1 | 8/2002 | Suzuki et al. | |
| 2010/0084062 A1* | 4/2010 | Miyazaki | B60C 11/1281 152/209.18 |
| 2013/0112325 A1* | 5/2013 | Mukai | B60C 11/0304 152/209.8 |
| 2013/0206298 A1 | 8/2013 | Guillermou et al. | |
| 2014/0290815 A1* | 10/2014 | Tomida | B60C 11/1236 152/209.18 |
| 2014/0305559 A1* | 10/2014 | Takemoto | B60C 11/0304 152/209.8 |
| 2016/0039248 A1* | 2/2016 | Sueno | B60C 11/04 152/209.8 |
| 2016/0039249 A1* | 2/2016 | Takahashi | B60C 11/1236 152/209.15 |
| 2016/0152090 A1 | 6/2016 | Takemoto | |
| 2016/0257172 A1* | 9/2016 | Mukai | B60C 11/1392 |
| 2018/0015788 A1 | 1/2018 | Hayashi | |
| 2019/0001753 A1* | 1/2019 | Hayashi | B60C 11/0304 |

FOREIGN PATENT DOCUMENTS

| | | | | | |
|---|---|---|---|---|---|
| EP | 0213452 | A2 | * | 3/1987 | ............. B60C 11/12 |
| EP | 213452 | A2 | * | 3/1987 | |
| JP | 2001-219715 | | | 8/2001 | |
| JP | 2005075213 | A | * | 3/2005 | |
| JP | 2007-223493 | A | * | 9/2007 | |
| JP | 2013-035345 | | | 2/2013 | |
| JP | 2013086683 | A | * | 5/2013 | |
| JP | 2013-537134 | | | 9/2013 | |
| JP | 2014-019308 | A | * | 2/2014 | |
| JP | 2015-160487 | | | 9/2015 | |
| JP | 2015231812 | A | * | 12/2015 | |
| JP | 2016-101802 | | | 6/2016 | |
| WO | WO 2012/032144 | | | 3/2012 | |
| WO | WO 2014/056651 | | | 4/2014 | |
| WO | WO 2016/125814 | | | 8/2016 | |
| WO | WO 2017/141651 | | | 8/2017 | |
| WO | WO 2017/141912 | | | 8/2017 | |
| WO | WO 2017/141914 | | | 8/2017 | |

OTHER PUBLICATIONS

Sommer, EP-0213452-A2 Machine Translation (Year: 1987).*
Machine translation for Japan 2014-019308 (Year: 2022).*
Machine translation for Japan 2007-223493 (Year: 2022).*
Machine translation for Europe 213452 (Year: 2022).*
International Search Report for International Application No. PCT/JP2017/031205 dated Nov. 28, 2017, 4 pages, Japan.

* cited by examiner

PNEUMATIC TIRE

TECHNICAL FIELD

The present technology relates to a pneumatic tire, and more particularly, to a pneumatic tire capable of improving steering stability performance on a dry road surface and improving steering stability performance on a wet road surface in a compatible manner by devising a chamfered shape of a sipe.

BACKGROUND ART

Conventionally, in a tread pattern of a pneumatic tire, a plurality of sipes are formed on ribs defined by a plurality of main grooves. Such sipes are provided such that drainage properties are ensured and the steering stability performance on the wet road surface is achieved. However, when a large number of sipes are disposed in the tread portion for improving the steering stability performance on the wet road surface, the rigidity of the rib is reduced, so there is a disadvantage that the steering stability performance on the dry road surface is deteriorated.

Various proposals have been made on pneumatic tires in which sipes are formed in a tread pattern and chamfered (see, for example, Japan Unexamined Patent Publication No. 2013-537134). When forming a sipe and chamfering it, the edge effect may be lost depending on the shape of chamfer, and improvement in steering stability performance on the dry road surface or steering stability performance on the wet road surface may be insufficient depending on the chamfering size.

SUMMARY

The present technology provides a pneumatic tire capable of achieving both the improvement of steering stability performance on the dry road surface and the improvement of steering stability performance on the wet road surface by devising a chamfer shape of a sipe.

A pneumatic tire of the present technology for achieving the above object is a pneumatic tire including, in a tread portion, a plurality of main grooves extending in a tire circumferential direction; in a rib defined by the main grooves, an auxiliary groove including at least one end communicating with one of the plurality of main grooves; and a sipe extending in a tire width direction, wherein, the sipe includes a leading side edge and a trailing side edge, a chamfered portion shorter than a sipe length of the sipe is formed in each of the leading side edge and the trailing side edge, a non-chamfered region in which no other chamfered portion is present is provided in a part facing the chamfered portion of each of the leading side edge and the trailing side edge of the sipe, at least one end of the sipe communicates with the auxiliary groove, one end of the chamfered portion adjacent to the auxiliary groove in the rib communicates with the auxiliary groove, a maximum depth x (mm) of the sipe and a maximum depth y (mm) of the chamfered portion satisfy $x \times 0.1 \leq y \leq x \times 0.3 + 1.0$, and a sipe width of the sipe is constant in a range from an end positioned in a radial direction inside the chamfered portion to a groove bottom of the sipe.

According to the present technology, in a pneumatic tire including a sipe extending in the tire width direction on a rib defined by a main groove, while a chamfered portion shorter than the sipe length of the sipe is formed in each of the leading side edge and the trailing side edge of the sipe, there is a non-chamfered region including no chamfered portion in the part facing each chamfered portion in the sipe, thereby improving the drainage effect based on the chamfered portion, and at the same time the non-chamfered region is capable of effectively removing the water film by the edge effect. This thereby enables the steering stability performance on the wet road surface to be significantly improved. Moreover, since the chamfered portion and the non-chamfered region are mixed in each of the leading side edge and the trailing side edge, the beneficial effect of improving the wet performance as described above may be maximized at the time of braking and at the time of accelerating. Further, compared to the sipe chamfered in a conventional manner, since the area to be chamfered can be minimized, improvement in steering stability performance on the dry road surface is enabled. As a result, achieving both the improvement of steering stability performance on the dry road surface and the improvement of steering stability performance on the wet road surface is enabled. Further, since the rib defined by the main groove is provided with the auxiliary groove at least one end of which communicates with the main groove, at least one end of the sipe communicates with the auxiliary groove, and one end of the chamfered portion adjacent to the auxiliary groove in the rib communicates with the auxiliary groove, this enables the groove volume to be secured and the steering stability performance on the wet road surface to be improved.

In the present technology, it is preferable that the sipe includes a first end communicating with the auxiliary groove and a second end terminating within the rib. This enables the rigidity of the tread portion to be improved since the ribs are not divided by the sipes and the auxiliary grooves, thereby enabling the steering stability performance on the dry road surface to be improved.

In the present technology, it is preferable that the pneumatic tire is a pneumatic tire a mounting direction of which with respect to the vehicle is designated, and the end of the sipe terminating in the rib is disposed on the vehicle outer side. This enables the sound radiated outside the vehicle to be suppressed, thereby enabling the noise performance to be improved.

In the present technology, it is preferable that the sipe includes a first end communicating with the auxiliary groove and a second end communicating with the main groove. This improves the drainage properties thereby enabling the steering stability performance on the wet road surface to be improved.

In the present technology, it is preferable that the pneumatic tire is a pneumatic tire a mounting direction of which with respect to the vehicle is designated, and the sipe communicates with the main groove on the vehicle inner side via the auxiliary groove. This enables the noise performance and the steering stability performance on the wet road surface to be improved in a well-balanced manner.

In the present technology, it is preferable that both ends of the sipe respectively communicate with the auxiliary grooves. This increases the volume of the groove, enabling the steering stability performance on the wet road surface to be improved.

DETAILED DESCRIPTION

Figure 1:
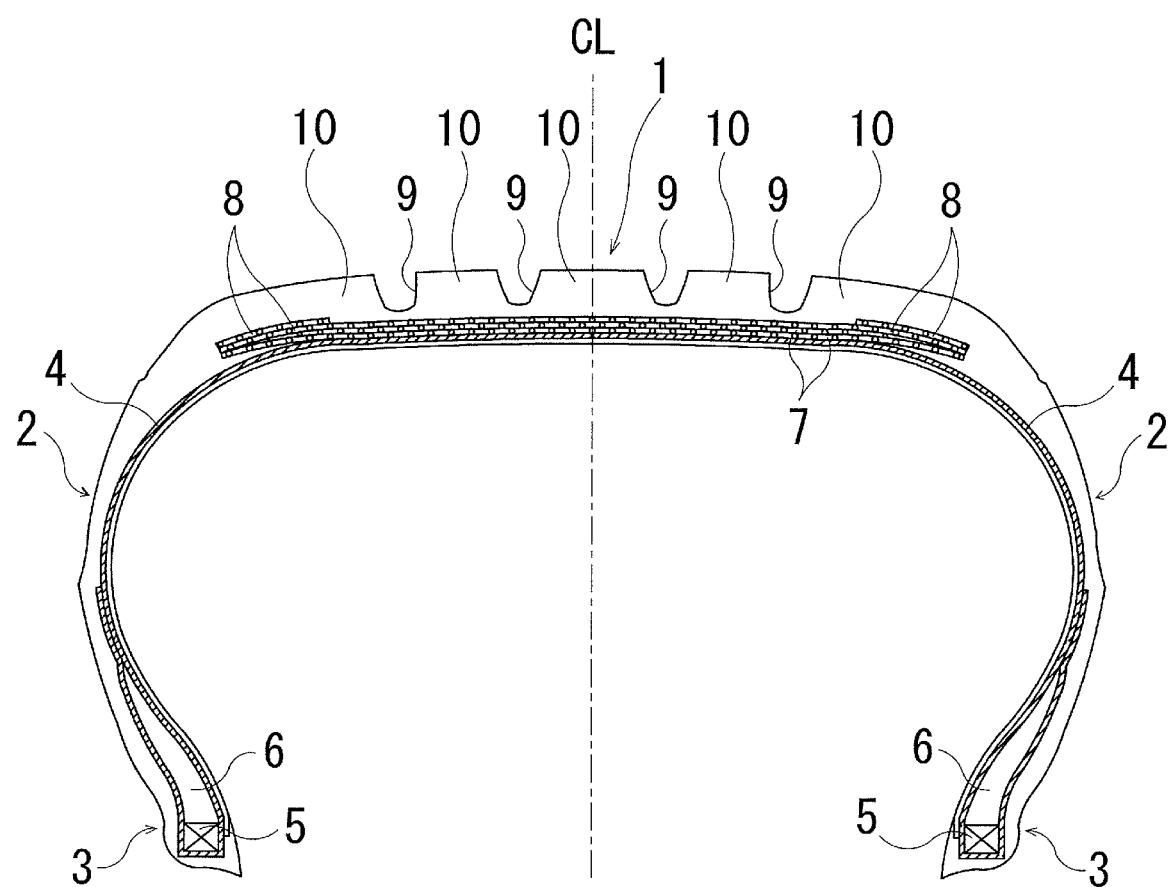
FIG. 1 is a meridian cross-sectional view illustrating a pneumatic tire according to an embodiment of the present technology.

The configuration of embodiments of the present technology is described in detail below with reference to the accompanying drawings. In FIG. 1, CL is the tire equatorial plane.

As illustrated in FIG. 1, a pneumatic tire according to embodiments of the present technology includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on an outer circumferential side of the carcass layer 4 in the tread portion 1. The belt layers 7 include a plurality of reinforcing cords that are inclined with respect to the tire circumferential direction with the reinforcing cords of the different layers arranged in a criss-cross manner. In the belt layers 7, an inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Also, a plurality of main grooves 9 extending in the tire circumferential direction is formed in the tread portion 1. These main grooves 9 define the tread portion 1 into a plurality of rows of ribs 10. In the present technology, the main groove 9 is a groove having a wear indicator.

Note that the tire internal structure described above represents a typical example for a pneumatic tire, and the pneumatic tire is not limited thereto.

Figure 2:
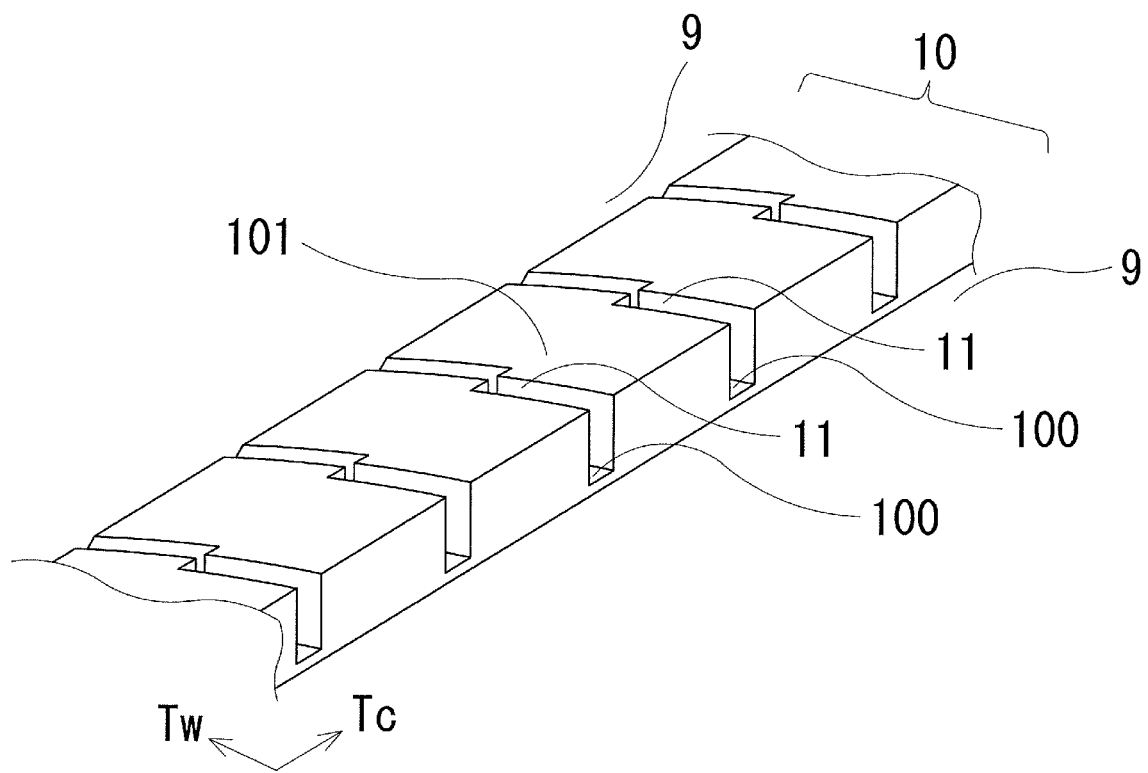
FIG. 2 is a perspective view illustrating part of a tread portion of a pneumatic tire according to the present technology.
Figure 3:
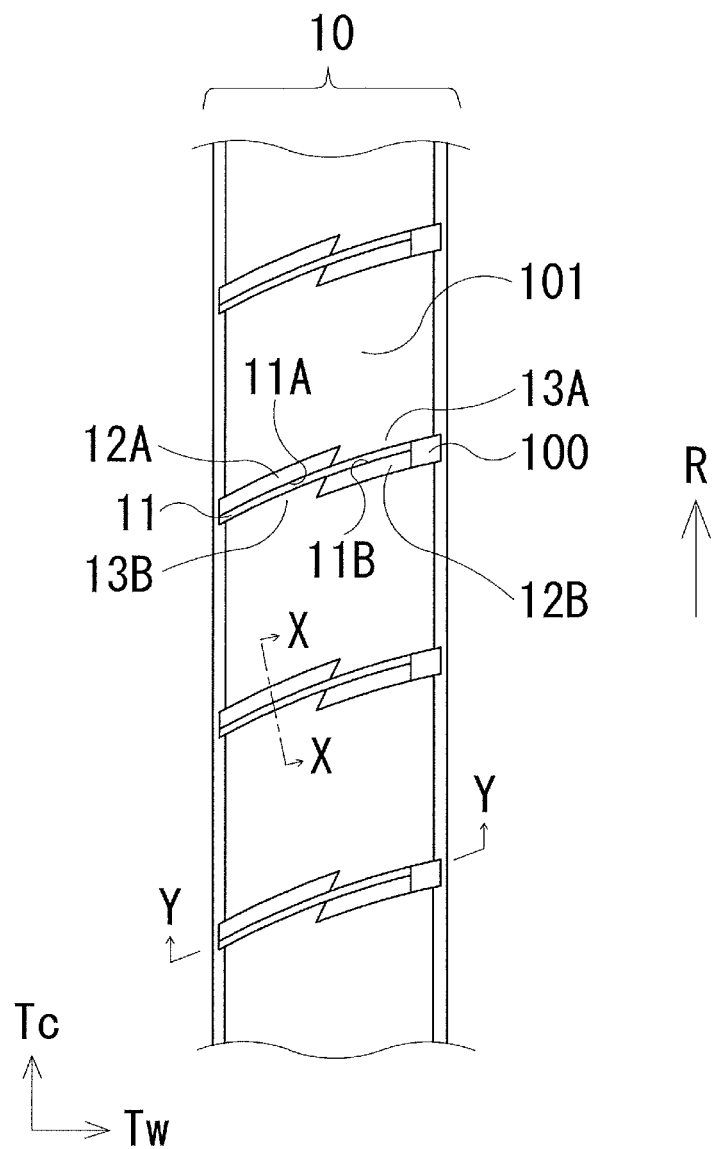
FIG. 3 is a plan view illustrating part of a tread portion of a pneumatic tire according to the present technology.
Figure 4:
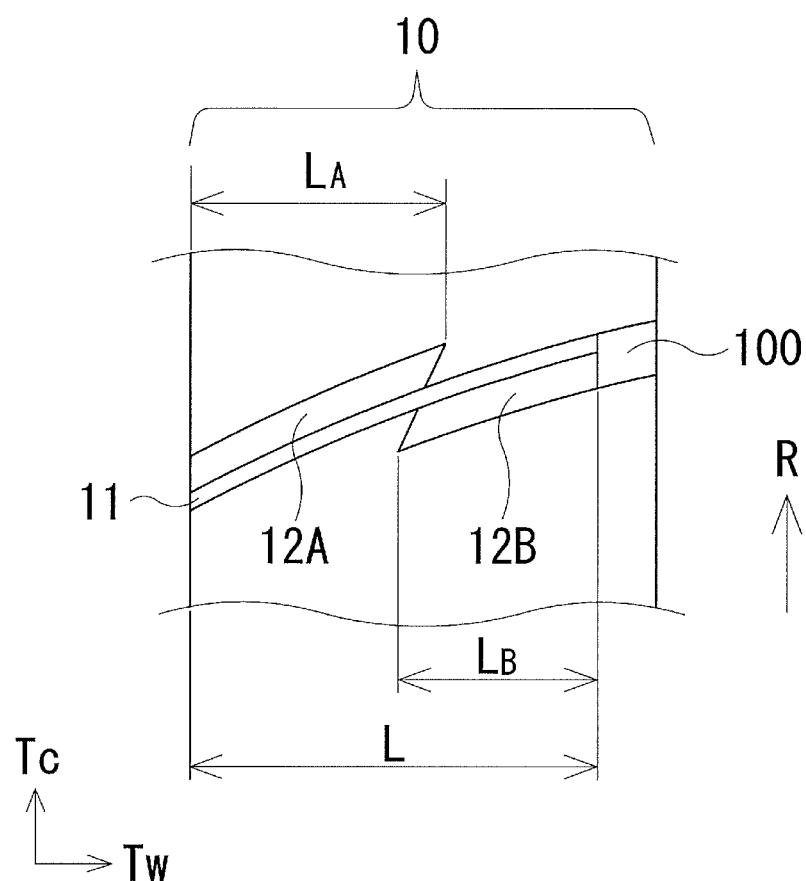
FIG. 4 is a plan view illustrating a sipe, a chamfered portion thereof and an auxiliary groove formed in the tread portion of FIG. 3.

FIGS. 2 to 4 illustrate a part of the tread portion 1, Tc indicates the tire circumferential direction, and Tw indicates the tire width direction. As illustrated in FIGS. 2 and 3, the rib 10 includes an auxiliary groove 100 with at least one end communicating with the main groove 9, a plurality of sipes 11 extending in the tire width direction, and a block 101 defined by these sipes 11. The plurality of blocks 101 are arranged to line up in the tire circumferential direction.

The auxiliary groove 100 illustrated in FIGS. 2 and 3 is a lateral groove extending in the tire width direction from the main groove 9. In the embodiment of FIGS. 2 and 3, the auxiliary groove 100 includes a first end communicating with the main groove 9 and a second end terminating within the rib 10. However, the auxiliary groove 100 may be formed to penetrate the rib 10 diagonally. Namely, in the present technology, it suffices that at least one end of the auxiliary groove 100 communicates with the main groove 9. Note that, in the present technology, the auxiliary groove 100 is a groove having no wear indicator.

The sipe 11 is a narrow groove having a groove width of 1.5 mm or less. The sipe 11 is an open sipe penetrating the ribs 10 in the tire width direction via the auxiliary grooves 100. Namely, a first end of the sipe 11 communicates with the main groove 9 adjacent to the rib 10, and a second end communicates with the main groove 9 via the auxiliary groove 100. On the other hand, in the present technology, the sipe 11 may alternatively be configured as a semi-closed sipe with only one end communicating with the main groove 9. Namely, in such a configuration, the first end of the sipe 11 communicates with the main groove 9 located on one side of the rib 10, and the second end terminates within the rib 10.

As illustrated in FIG. 3, the sipe 11 has a curved shape as a whole, and a plurality of the sipes 11 are formed in the rib 10 at intervals in the tire circumferential direction. Further, the sipe 11 includes an edge 11A which is on the leading side with respect to the rotation direction R, and an edge 11B which is on the trailing side with respect to the rotation direction R. A chamfered portion 12 is formed on each of the edge 11A on the leading side and the edge 11B on the trailing side.

The chamfered portion 12 includes a chamfered portion 12A which is on the leading side with respect to the rotation direction R and a chamfered portion 12B which is on the trailing side with respect to the rotation direction R. There is a non-chamfered region 13 including no chamfered portion in the part facing the chamfered portion 12. Namely, there is a non-chamfered region 13B which is on the trailing side with respect to the rotational direction R at a part facing the chamfered portion 12A and a non-chamfered region 13A which is on the leading side with respect to the rotational direction R at a part facing the chamfered portion 12B. In this manner, the chamfered portion 12 and the non-chamfered region 13 including no chamfered portion are disposed adjacent to each other on each of the edge 11A on the leading side and the edge 11B on the trailing side of the sipe 11.

As illustrated in FIG. 4, in the sipe 11 and the chamfered portions 12A and 12B, the length in the tire width direction is set as the sipe length L, the chamfered lengths $L_A$ and LB, respectively. These sipe length L and the chamfered lengths $L_A$ and $L_B$ are the length in the tire width direction from one end to the other end of each of the sipes 11 or the chamfered portions 12A and 12B. The chamfered lengths $L_A$ and $L_B$ of the chamfered portions 12A and 12B are both formed to be shorter than the sipe length L of the sipe 11. In addition, the chamfered portion 12B adjacent to the auxiliary groove 100 in the rib 10 includes an end communicating with the auxiliary groove 100.

Figure 5:
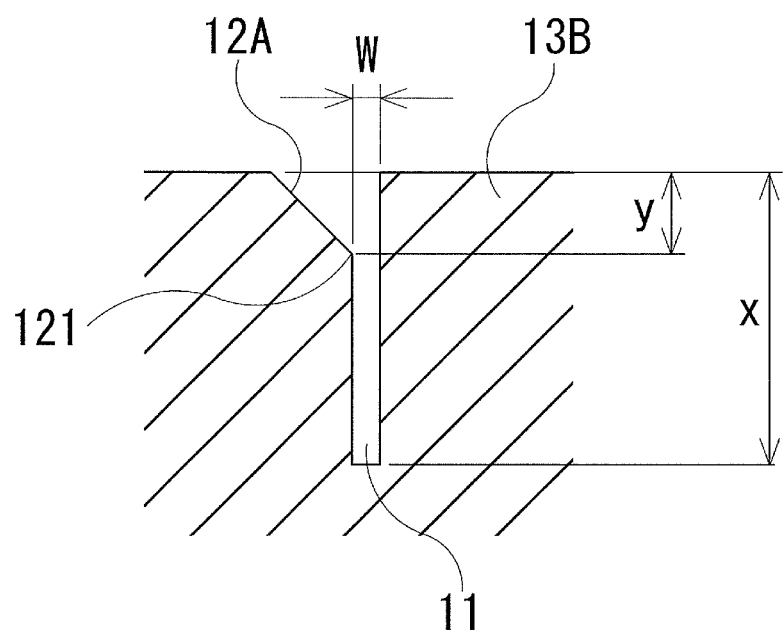
FIG. 5 is a cross-sectional view taken along the line X-X in FIG. 3.

FIG. 5 is a cross-sectional view perpendicular to the sipe 11 and illustrates a cutout of the tread portion 1 in the vertical direction. As illustrated in FIG. 5, when the maximum depth of the sipe 11 is set as x (mm) and the maximum depth of the chamfered portion 12 is set as y (mm), the sipe 11 and the chamfered portion 12 are formed such that the maximum depth x (mm) and the maximum depth y (mm) satisfy the relationship of the following formula (1). The maximum depth x of the sipe 11 is preferably from 3 mm to 8 mm. The sipe width W of the sipe 11 is substantially constant in a range from an end 121 located on the inner side in the tire radial direction of the chamfered portion 12 to the groove bottom of the sipe 11. The sipe width W is determined such that the width is the substantially measured width of the sipe 11, for example, in a case that a ridge exists on the groove wall of the sipe 11, by not including the height of the ridge in the sipe width, or in a case that the sipe width of the sipe 11 gradually narrows toward the groove bottom, by not including the narrowed portion in the sipe width.

$$x \times 0.1 \leq y \leq x \times 0.3 + 1.0 \quad (1)$$

In the above-described pneumatic tire, by providing a chamfered portion 12 shorter than the sipe length L of the sipe 11 in each of a leading side edge 11A and a trailing side edge 11B of the sipe 11, and since there is a non-chamfered region 13 including no chamfered portion in the part facing each chamfered portion 12 in the sipe 11, the drainage effect is improved based on the chamfered portion 12, and at the same time the non-chamfered region 13 is capable of effectively removing the water film by the edge effect. This thereby enables the steering stability performance on the wet road surface to be significantly improved. Moreover, since the chamfered portion 12 and the non-chamfered region 13 including no chamfered portion are mixed in each of the leading side edge 11A and the trailing side edge 11B, the beneficial effect of improving the wet performance as described above may be maximized at the time of braking and at the time of accelerating. Furthermore, because the rib 10 defined by the main groove 9 is provided with the auxiliary groove 100 with at least one end communicating with the main groove 9, at least one end of the sipe 11 communicates with the auxiliary groove 100, and one end of the chamfered portion 12 adjacent to the auxiliary groove 100 in the rib 10 communicates with the auxiliary groove 100, this enables the groove volume to be secured and the steering stability performance on the wet road surface to be improved.

In the pneumatic tire as described above, it is necessary that the maximum depth x (mm) and the maximum depth y (mm) satisfy the relationship of the above formula (1). By providing the sipe 11 and the chamfered portion 12 so as to satisfy the relationship of the above-described formula (1), compared to the sipe chamfered in a conventional manner, minimizing the area to be chamfered enables the steering stability performance on the dry road surface to be improved. As a result, achieving both the improvement of steering stability performance on the dry road surface and the improvement of steering stability performance on the wet road surface is enabled. Here, if y<x×0.1, the drainage effect based on the chamfered portion 12 becomes insufficient, and conversely, if y>x×0.3+1.0, the rigidity of the rib 10 deteriorates, lowering the steering stability performance on the dry road surface. It is particularly preferable to satisfy the relation y≤x×0.3+0.5.

In the above-described pneumatic tire, as illustrated in FIG. 4, the first end of the sipe 11 communicates with the auxiliary groove 100. On the other hand, it is preferable that the second end of the sipe 11 communicates with the main groove 9. By providing the sipes 11 in this manner, the drainage property is improved, and this enables the steering stability performance on the wet road surface to be improved.

Figure 6:
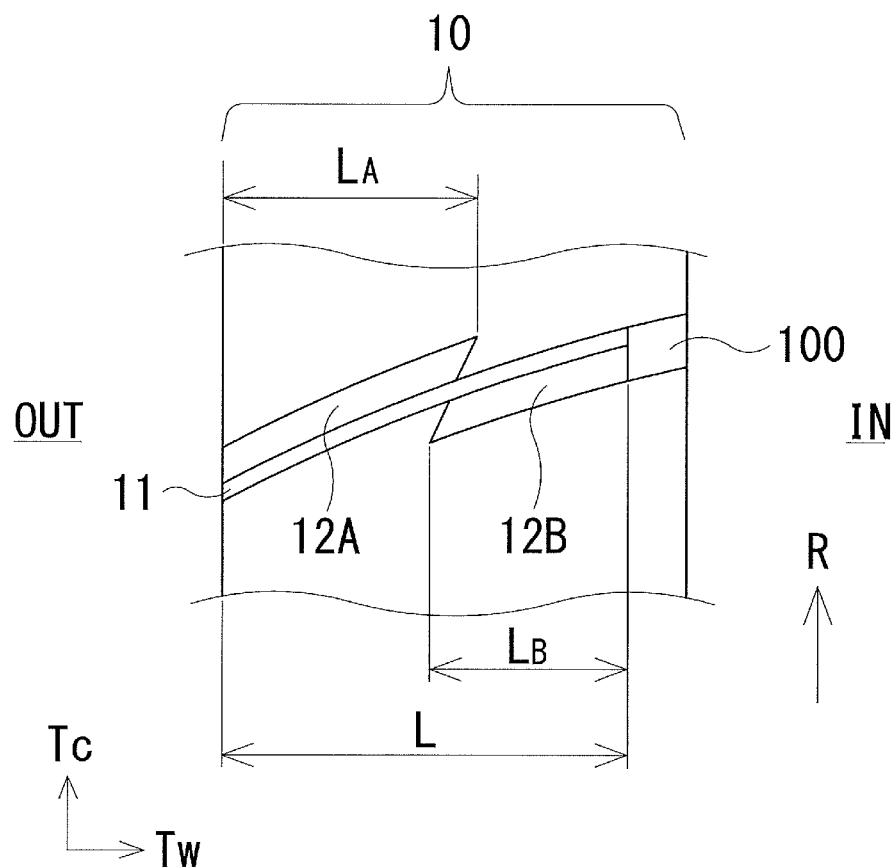
FIG. 6 is a plan view illustrating a modified example of a sipe, a chamfered portion thereof and an auxiliary groove formed in the tread portion of a pneumatic tire according to the present technology.

FIG. 6 illustrates another modified example of the sipe 11, the chamfered portion 12, and the auxiliary groove 100 formed in the tread portion 1 of the pneumatic tire according to the present technology. In FIG. 6, the mounting direction of the pneumatic tire with respect to the vehicle is specified, IN indicating the vehicle inner side and OUT indicating the vehicle outer side. The sipe 11 communicates with the main groove 9 located on the vehicle inner side of the rib 10 via the auxiliary groove 100. Disposing the sipe 11 and the auxiliary groove 100 in this manner enables the noise performance and the steering stability performance on the wet road surface to be improved in a well-balanced manner.

Figure 7A:
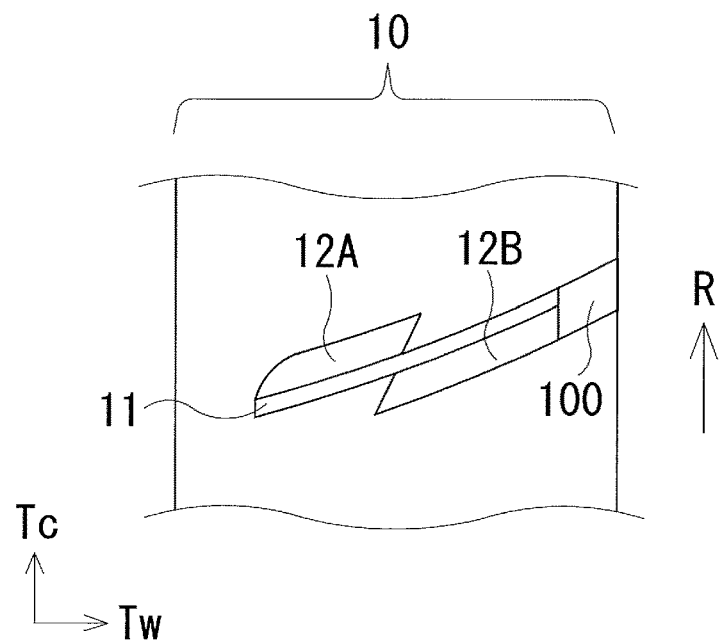
FIGS. 7A and 7B illustrate another modified example of a sipe, a chamfered portion thereof and an auxiliary groove formed in the tread portion of a pneumatic tire according to the present technology, FIGS. 7A and 7B being plan views of each of the modified examples.
Figure 7B:
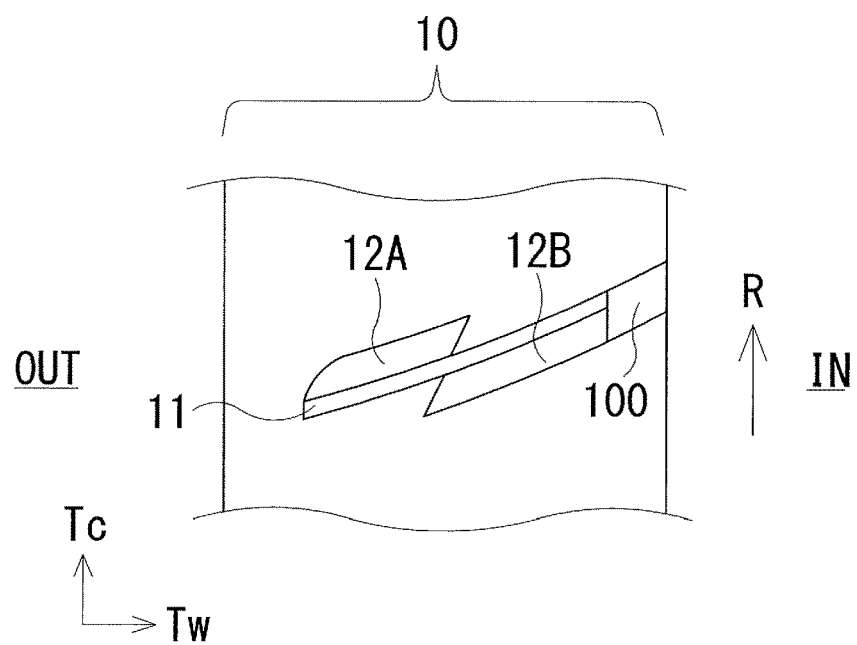

FIGS. 7A and 7B illustrate another modified example of the sipe 11, the chamfered portion 12, and the auxiliary groove 100 formed in the tread portion 1 of the pneumatic tire according to the present technology. In the sipe 11 illustrated in FIG. 7A, the first end communicates with the auxiliary groove 100 and the second end terminates within the rib 10. Disposing the sipe 11 and the auxiliary groove 100 in this manner prevents the ribs 10 from being divided by the sipe 11 and the auxiliary groove 100, thereby improving the rigidity of the tread portion 1, enabling the steering stability performance on the dry road surface to be improved.

In FIG. 7B, the mounting direction of the pneumatic tire with respect to the vehicle is specified, IN indicating the vehicle inner side, and OUT indicating the vehicle outer side. In the sipe 11 illustrated in FIG. 7B, the first end communicates with the auxiliary groove 100 and the second end terminates within the rib 10. The end terminating in the rib 10, namely, the end not in communication with the main groove 9 or the auxiliary groove 100, is disposed on the vehicle outer side. Disposing the sipes 11 and the auxiliary grooves 100 in this manner allows the vehicle external noise radiation to be suppressed, thereby enabling the noise performance to be improved.

Figure 8A:
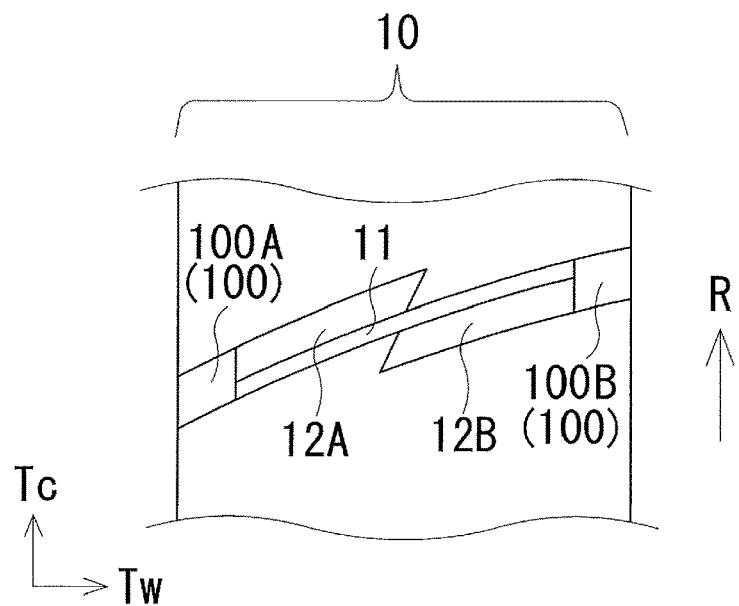
FIGS. 8A and 8B illustrate another modified example of a sipe, a chamfered portion thereof and an auxiliary groove formed in the tread portion of a pneumatic tire according to the present technology, FIGS. 8A and 8B being plan views of each of the modified examples.
Figure 8B:
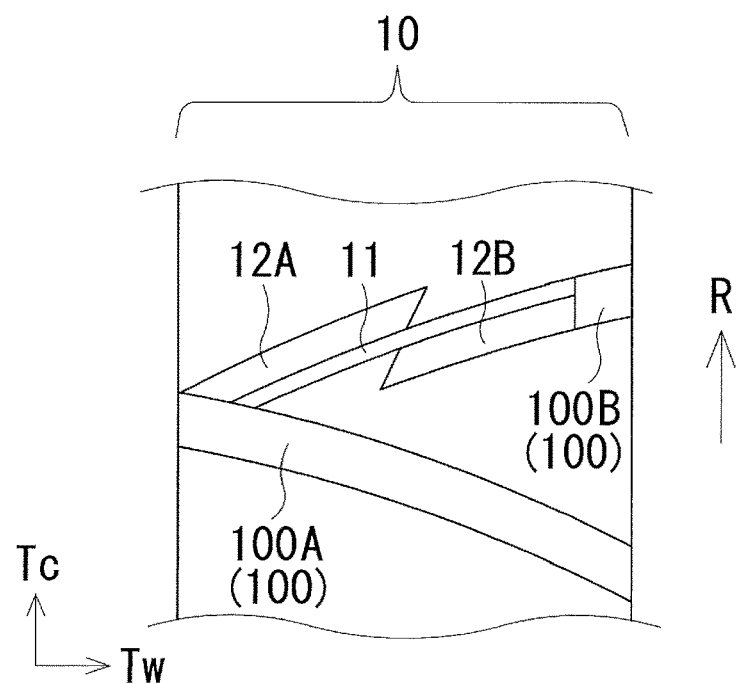

FIGS. 8A and 8B illustrate another modified example of the sipe 11, the chamfered portion 12, and the auxiliary groove 100 formed in the tread portion 1 of the pneumatic tire according to the present technology. As illustrated in FIG. 8A, two auxiliary grooves 100A and 100B extending in the tire width direction are formed on both sides of the rib 10. On the other hand, as illustrated in FIG. 8B, an auxiliary groove 100B extending in the tire width direction on one side of the rib 10 and an auxiliary groove 100A passing obliquely through the rib 10 are formed in the rib 10. In each of FIGS. 8A and 8B, both ends of the sipe 11 communicate with the auxiliary grooves 100A and 100B, respectively.

Disposing the sipes 11 and the auxiliary grooves 100 in this manner increases the groove volume, thereby enabling the steering stability performance on the wet road surface to be improved.

Figure 9:
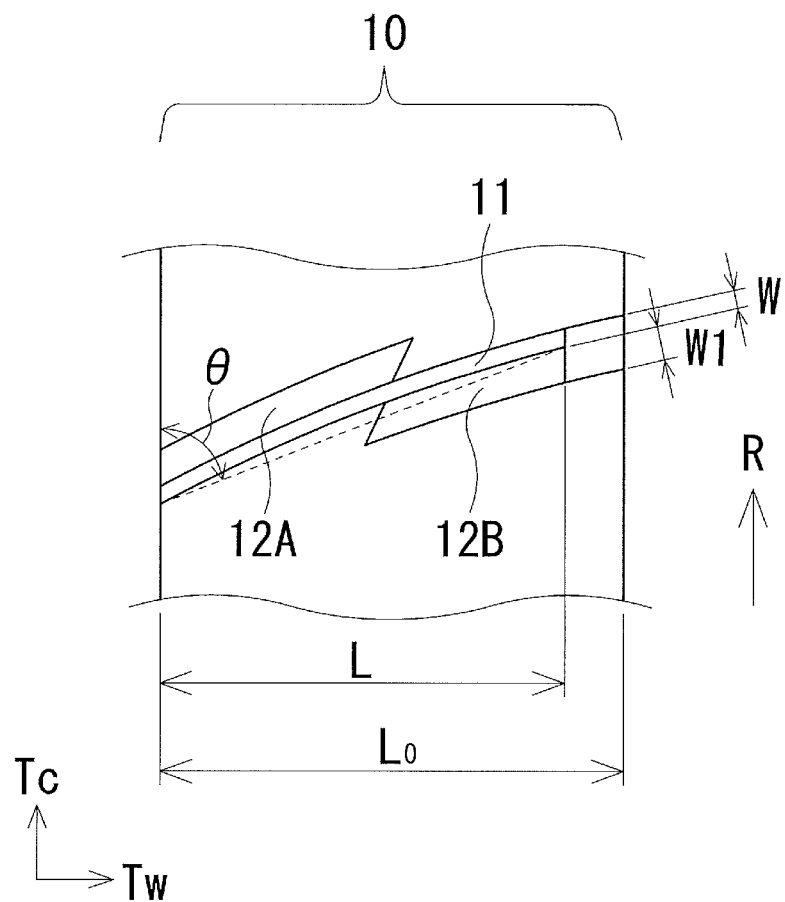
FIG. 9 is a plan view illustrating another modified example of a sipe, a chamfered portion thereof, and an auxiliary groove formed in the tread portion of a pneumatic tire according to the present technology.

FIG. 9 illustrates another modified example of the sipe 11, the chamfered portion 12, and the auxiliary groove 100 formed in the tread portion 1 of the pneumatic tire according to the present technology. As illustrated in FIG. 9, the width in the tire width direction of the rib 10 is set as the rib width $L_0$. At this time, the sipe length L of the sipe 11 is preferably from 0.2 to 0.9 times and more preferably from 0.3 to 0.8 times the rib width $L_0$ of the rib 10. Setting the sipe length L of the sipe 11 to an appropriate length in this manner enables the noise performance to be improved, and also enables the improvement of steering stability performance on the dry road surface and the steering stability performance on the wet road surface to be achieved at the same time. Here, if the sipe length L of the sipe 11 is smaller than 0.2 times the rib width $L_0$ of the rib 10, a cut-back effect in the chamfering direction cannot be obtained, and if it exceeds 0.9 times, the distance between the groove wall of the main groove 9 and the edges 11A and 11B of the sipe 11 is shortened which may cause cracks during vulcanization and while in use.

The sipe 11 illustrated in FIG. 9 is formed to have an inclination angle θ with respect to the tire circumferential direction. The inclination angle θ refers to an angle formed between a virtual line (a dotted line illustrated in FIG. 9) connecting both ends of the sipe 11 and a side surface of the block 101. There is an inclination angle on the acute angle side and an inclination angle on the obtuse angle side, and the inclination angle θ on the acute angle side is illustrated in FIG. 9. The inclination angle θ is meant to be the inclination angle of the sipe 11 with an intermediate pitch in the rib 10. In this case, the inclination angle θ on the acute angle side is preferably 40° to 80°, and more preferably 50° to 70°. By inclining the sipe 11 with respect to the circumferential direction of the tire in this manner, the pattern rigidity can be improved, and the steering stability performance on the dry road surface can be further improved. Here, when the inclination angle θ is smaller than 40°, the uneven wear resistance deteriorates, and when it exceeds 80°, the pattern rigidity cannot be sufficiently improved.

In the present technology, the side having the inclination angle θ on the acute angle side of the sipe 11 is defined as the acute angle side, and the side having the inclination angle θ on the obtuse angle side of the sipe 11 is defined as the obtuse angle side. The chamfered portions 12A and 12B formed on the edges 11A and 11B of the sipe 11 are formed on the acute angle side of the sipe 11. Chamfering the acute angle side of the sipe 11 as described above enables the uneven wear resistance performance to be further improved. Alternatively, the chamfered portions 12A and 12B may be formed on the obtuse angle side of the sipe 11. Forming the chamfered portion 12 on the obtuse angle side of the sipe 11 as described above enables the edge effect to be increased and the steering stability performance on the wet road surface to be further improved.

In the present technology, having the entire shape of the sipe 11 curved as described above enables the steering stability performance to be improved on the wet road surface. Further, a part of the sipe 11 may be curved or bent in a plan view. Forming the sipe 11 in this manner increases the total amount of the edges 11A, 11B in each sipe 11, enabling the steering stability performance on the wet road surface to be improved.

As illustrated in FIG. 9, one chamfered portion 12 is disposed on each of the edge 11A on the leading side and the edge 11B on the trailing side of the sipe 11. Having the chamfered portions 12 disposed in this manner enables the uneven wear resistance performance to be improved. Here, forming the chamfered portion 12 in two or more places on the edge 11A on the leading side and the edge 11B on the trailing side of the sipe 11 increases the number of nodes and tends to deteriorate the uneven wear resistance performance.

Here, the maximum value of the width of the chamfered portion 12 measured along the direction orthogonal to the sipe 11 is defined as a width W1. In this case, the maximum width W1 of the chamfered portion 12 is preferably 0.8 to 5.0 times, and more preferably 1.2 to 3.0 times, the sipe width W of the sipe 11. Setting the maximum width W1 of the chamfered portion 12 with respect to the sipe width W at an appropriate value in this manner enables both the steering stability performance on the dry road surface and the steering stability performance on the wet road surface to be improved. Here, when the maximum width W1 of the chamfered portion 12 is smaller than 0.8 times the sipe width W of the sipe 11, the improvement of steering stability performance on the wet road surface is made insufficient, and if it is larger than 5.0 times, the improvement of steering stability performance on the dry road surface is made insufficient.

Further, the outer edge portion in the longitudinal direction of the chamfered portion 12 is formed to be parallel to the extending direction of the sipe 11. Having the chamfered portion 12 extended in parallel with the sipe 11 in this manner enables the uneven wear resistance performance to be improved, and at the same time enables both the steering stability performance on the dry road surface and the steering stability performance on the wet road surface to be improved.

Figure 10A:
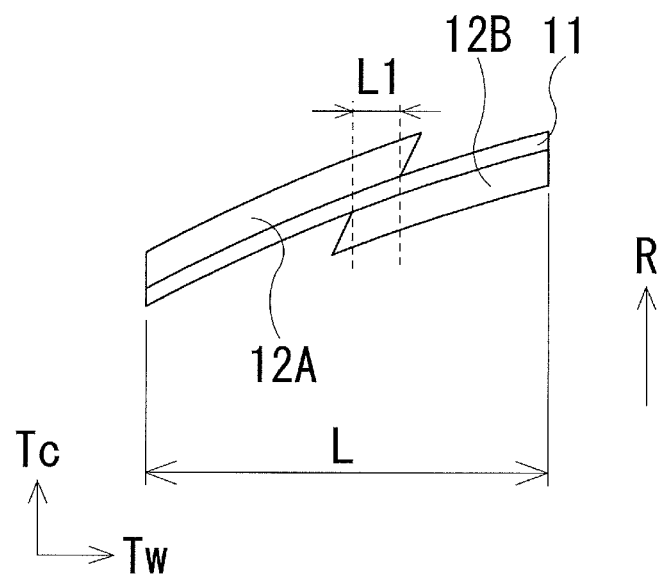
FIGS. 10A and 10B illustrate another modified example of a sipe and a chamfered portion thereof formed in the tread portion of a pneumatic tire according to the present technology, FIGS. 10A and 10B being plan views of each of the modified examples.
Figure 10B:
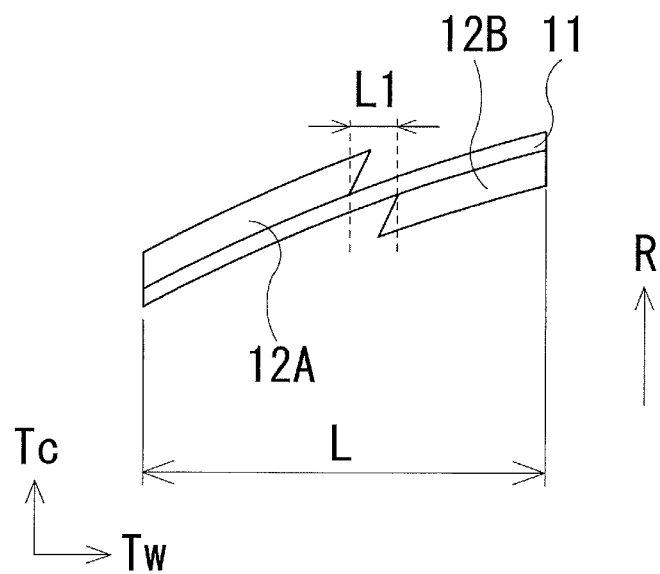

As illustrated in FIG. 10A, the chamfered portion 12A and the chamfered portion 12B are formed so that part of both chamfered portions 12A, 12B overlap each other at the central portion of the sipe 11. Here, the length in the tire width direction of the overlap portion, which is a portion where the chamfered portion 12A and the chamfered portion 12B overlap, is set as an overlap length L1. On the other hand, as illustrated in FIG. 10B, in a case that parts of both the chamfered portion 12A and the chamfered portion 12B do not overlap and are spaced apart from each other at a certain interval, the ratio of the sipe overlap length L1 to the sipe length L is expressed as a negative value. The overlap length L1 of the overlap portion is preferably from −30% to 30%, and more preferably from −15% to 15%, of the sipe length L. Appropriately configuring the overlap length L1 in the chamfered portion 12 with respect to the sipe length L in this manner enables both the steering stability performance on the dry road surface and the steering stability performance on the wet road surface to be both achieved. Here, if the overlap length L1 is larger than 30%, the improvement in steering stability performance on the dry road surface becomes insufficient, and if it is smaller than −30%, the improvement in steering stability performance on the wet road surface becomes insufficient.

Figure 11:
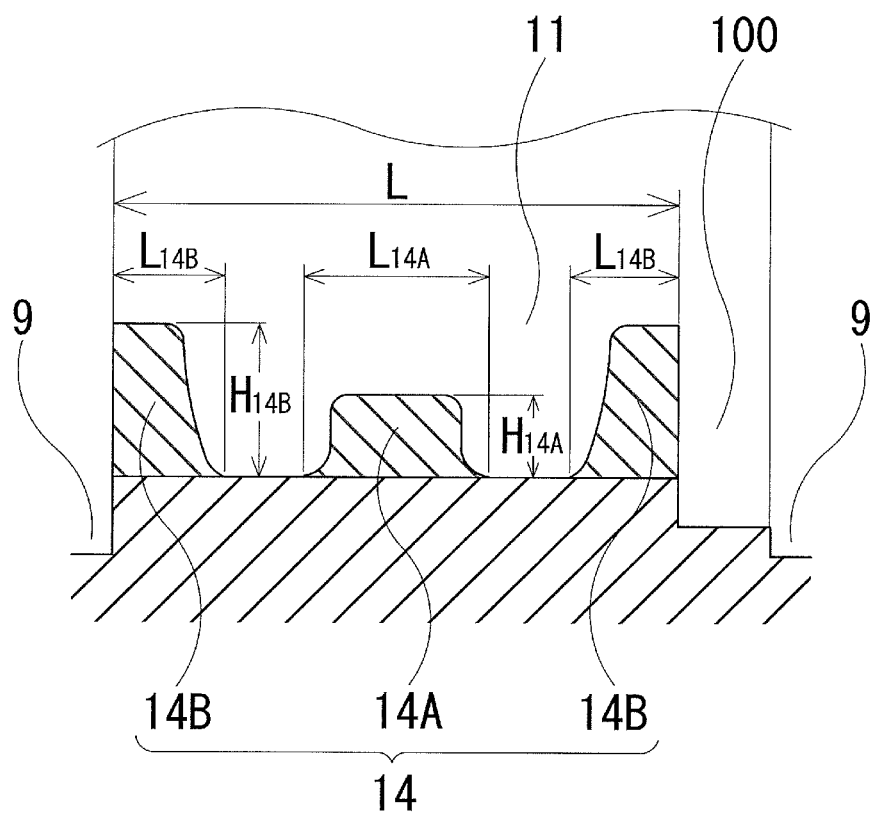
FIG. 11 is a cross-sectional view taken along the line Y-Y of FIG. 3.

As illustrated in FIG. 11, the sipe 11 includes a raised bottom portion 14 in a part of its longitudinal direction. The raised bottom portion 14 includes a raised bottom portion 14A positioned at the central portion of the sipe 11, and a raised bottom portion 14B positioned at both ends of the sipe 11. Providing the raised bottom portion 14 in the sipe 11 in this manner enables the improvement in steering stability performance on the dry road surface and the improvement in steering stability performance on the wet road surface to be both achieved.

The raised bottom portion 14 of the sipe 11 may be formed at an end portion and/or a non-end portion of the sipe 11.

The height of the raised bottom portion 14 in the tire radial direction formed in the sipe 11 is defined as a height $H_{14}$. The maximum value of the height from the groove bottom of the sipe 11 to the upper surface of the raised bottom portion 14A in the raised bottom portion 14A formed besides the end of the sipe 11 is set as the height $H_{14A}$. This height $h_{14A}$ is preferably 0.2 to 0.5 times, and more preferably 0.3 to 0.4 times, the maximum depth x of the sipe 11. Setting the height $H_{14A}$ of the raised bottom portion 14A disposed at a position other than the end of the sipe 11 at an appropriate height in this manner enables the rigidity of the block 101 to be improved and the drainage effect to be maintained, thereby improving the steering stability performance on the wet road surface. Here, if the height $H_{14A}$ is smaller than 0.2 times the maximum depth x of the sipe 11, the rigidity of the block 101 cannot be sufficiently improved, and if it is larger than 0.5 times, the steering stability performance on the wet road surface cannot be sufficiently improved.

In the raised bottom portion 14B formed at both ends of the sipe 11, the maximum value of the height from the groove bottom of the sipe 11 to the upper surface of the raised bottom portion 14B is set as the height $H_{14B}$. This height $H_{14B}$ is preferably 0.6 to 0.9 times, and more preferably 0.7 to 0.8 times, the maximum depth x of the sipe 11. Setting the height $H_{14B}$ of the raised bottom portion 14B formed at the end of the sipe 11 at an appropriate height in this manner enables the rigidity of the block 101 to be improved, enabling the steering stability performance on the dry road surface to be improved. Here, if the height $H_{14B}$ is smaller than 0.6 times the maximum depth x of the sipe 11, the rigidity of the block 101 cannot be sufficiently improved, and if it is larger than 0.9 times, the steering stability performance on the wet road surface cannot be sufficiently improved.

Further, the length in the tire width direction at the raised bottom portion 14 of the sipe 11 is set as the bottom raised length $L_{14}$. The raised lengths $L_{14A}$ and $L_{14B}$ of the raised bottom portions 14A and 14B are preferably 0.3 to 0.7 times, and more preferably 0.4 to 0.6 times, the sipe length L. Appropriately setting the raised lengths $L_{14A}$ and $L_{14B}$ of the raised bottom portions 14A and 14B in this manner enables the improvement of steering stability performance on the dry road surface and the improvement of steering stability performance on the wet road surface to be both achieved.

EXAMPLES

Pneumatic tires that include a plurality of main grooves extending in the tire circumferential direction in a tread portion and sipes extending in the tire width direction in a rib defined by the main grooves and have a tire size of 245/40 R19 were manufactured as indicated in Table 1 for the following items according to Conventional Examples 1, 2 and Examples 1 to 6: chamfer arrangement (both sides or one side); relationship between sipe length L and chamfer lengths $L_A$, $L_B$; whether the part facing the chamfered portion is chamfered; maximum sipe depth x (mm); maximum chamfered portion depth y (mm); change in sipe width W; whether the auxiliary groove is provided; sipe inclination angle on the acute angle side with respect to the tire circumferential direction; grooves communicating with both ends of sipe (main groove, auxiliary groove or none); and sipe length L to rib length $L_0$ ($L/L_0$).

These test tires were tested by a test driver for a sensory evaluation of steering stability performance on the dry road surface and steering stability performance on the wet road surface, and the sensory evaluation of noise performance, and the results were also indicated in Table 1.

In Table 1, "grooves communicating at both ends of sipe" indicates, when a tire mounting direction with respect to a vehicle is designated, the groove to which the end of the sipe located on the vehicle inner side communicates with and the groove to which the end of the sipe located on the vehicle outer side communicates with. Noted that, "none" means that the end thereof terminates within the rib.

Sensory evaluations on the driving stability performance on the dry road surface and steering stability performance on the wet road surface were conducted by assembling each test tire to a rim size 19×8.5 J wheel and mounting it on a vehicle with air pressure of 260 kPa. Evaluation results are expressed as index values, with the results of Conventional Example 1 being assigned an index value of 100. Larger index values indicate superior driving stability performance on a dry road surface and superior driving steering stability performance on a wet road surface.

A sensory evaluation on noise performance was conducted by assembling each test tire to a rim size 19×8.5 J wheel and mounting it on a vehicle with air pressure of 260 kPa. Evaluation results are expressed as index values, with the results of Conventional Example 1 being assigned an index value of 100. Larger index values indicate superior noise performance.

TABLE 1

|  |  | Conventional Example 1 | Conventional Example 2 | Example 1 | Example 2 |
|---|---|---|---|---|---|
| Chamfer arrangement (both sides or one side) |  | Both sides | One side | Both sides | Both sides |
| Relationship between sipe length L and chamfer length $L_A$, $L_B$ |  | $L > L_A, L_B$ | $L = L_A$ | $L > L_A, L_B$ | $L > L_A, L_B$ |
| Whether the part facing chamfered portion is chamfered |  | Yes | No | No | No |
| Sipe maximum depth x (mm) |  | 6 mm | 6 mm | 6 mm | 6 mm |
| Chamfered portion maximum depth y (mm) |  | 3 mm | 3 mm | 2 mm | 2 mm |
| Change in sipe width W |  | Constant | With change | Constant | Constant |
| Whether auxiliary groove is provided |  | No | No | Yes | Yes |
| Sipe inclination angle on acute angle side with respect to tire circumferential direction |  | 90° | 90° | 90° | 60° |
| Grooves communicating with both ends of sipe (Main groove, auxiliary groove, or none) | Vehicle inner side end | Main groove | Main groove | Auxiliary groove | None |
|  | Vehicle outer side end | Main groove | Main groove | Main groove | Auxiliary groove |
| Sipe length L to rib width $L_0$ ($L/L_0$) |  | 1.0 times | 1.0 times | 0.8 times | 0.5 times |

TABLE 1-continued

|  | | | | |
| --- | --- | --- | --- | --- |
| Dry road surface steering stability performance | 100 | 90 | 102 | 106 |
| Wet road surface steering stability performance | 100 | 105 | 101 | 100 |
| Noise performance | 100 | 100 | 100 | 100 |

|  | Example 3 | Example 4 | Example 5 | Example 6 |
| --- | --- | --- | --- | --- |
| Chamfer arrangement (both sides or one side) | Both sides | Both sides | Both sides | Both sides |
| Relationship between sipe length L and chamfer length $L_A$, $L_B$ | $L > L_A, L_B$ | $L > L_A, L_B$ | $L > L_A, L_B$ | $L > L_A, L_B$ |
| Whether the part facing chamfered portion is chamfered | No | No | No | No |
| Sipe maximum depth x (mm) | 6 mm | 6 mm | 6 mm | 6 mm |
| Chamfered portion maximum depth y (mm) | 2 mm | 2 mm | 2 mm | 2 mm |
| Change in sipe width W | Constant | Constant | Constant | Constant |
| Whether auxiliary groove is provided | Yes | Yes | Yes | Yes |
| Sipe inclination angle on acute angle side with respect to tire circumferential direction | 60° | 60° | 60° | 60° |
| Grooves communicating with both ends of sipe (Main groove, auxiliary groove, or none) — Vehicle inner side end | Auxiliary groove | Main groove | Auxiliary groove | Auxiliary groove |
| Grooves communicating with both ends of sipe — Vehicle outer side end | None | Auxiliary groove | Main groove | Auxiliary groove |
| Sipe length L to rib width $L_0$ ($L/L_0$) | 0.5 times | 0.8 times | 0.8 times | 0.8 times |
| Dry road surface steering stability performance | 106 | 104 | 104 | 104 |
| Wet road surface steering stability performance | 100 | 102 | 102 | 104 |
| Noise performance | 105 | 100 | 100 | 100 |

As can be seen from Table 1, by devising the shape of the chamfered portion formed in the sipe, the steering stability performance on the dry road surface and the steering stability performance on the wet road surface was improved in the tires of Examples 1 to 6 in a well-balanced manner. In addition, the noise performance of the tire of Example 3 was also improved.

The invention claimed is:

1. A pneumatic tire comprising: in a tread portion, a plurality of main grooves extending in a tire circumferential direction; in a rib defined by the main grooves, an auxiliary groove comprising at least one end communicating with one of the plurality of main grooves; and a sipe extending in a tire width direction,
the sipe comprising a leading side edge and a trailing side edge, a chamfered portion shorter than a sipe length of the sipe being formed in each of the leading side edge and the trailing side edge, a non-chamfered region in which no other chamfered portion is present being provided in a part facing the chamfered portion of each of the leading side edge and the trailing side edge of the sipe, at least one end of the sipe communicating with the auxiliary groove, one end of the chamfered portion adjacent to the auxiliary groove in the rib communicating with the auxiliary groove, a maximum depth x (mm) of the sipe and a maximum depth y (mm) of the chamfered portion satisfying x×0.1≤y≤x×0.3+1.0, a sipe width of the sipe being constant in a range from an end positioned in a radial direction inside the chamfered portion to a groove bottom of the sipe, and the sipe including only one chamfered portion and only one non-chamfered portion on the leading side edge and only one chamfered portion and only one non-chamfered portion on the trailing side edge; wherein
the chamfered portion formed in the leading side edge has a different length in the tire width direction than the chamfered portion formed in the trailing side edge; and
the sipe comprises a first end communicating with the auxiliary groove and a second end terminating within the rib.

2. The pneumatic tire according to claim 1, wherein a length of the auxiliary groove in the tire width direction is less than a shortest length in the tire width direction of the chamfered portion formed in the leading side edge and the chamfered portion formed in the trailing side edge.

3. The pneumatic tire according to claim 2, wherein the auxiliary groove width is equal to a combined width of the sipe and width of the chamfered portion on the leading side edge or on the trailing side edge.

4. The pneumatic tire according to claim 3, wherein one groove wall of the auxiliary groove is aligned with a groove wall of the sipe at one non-chamfered portion and another groove wall of the auxiliary groove is aligned with an edge of one chamfered portion, the edge being distal in the tire circumferential direction from the sipe.

5. A pneumatic tire comprising: in a tread portion, a plurality of main grooves extending in a tire circumferential direction; in a rib defined by the main grooves, an auxiliary groove comprising at least one end communicating with one of the plurality of main grooves; and a sipe extending in a tire width direction,
the sipe comprising a leading side edge and a trailing side edge, a chamfered portion shorter than a sipe length of the sipe being formed in each of the leading side edge and the trailing side edge, a non-chamfered region in which no other chamfered portion is present being provided in a part facing the chamfered portion of each of the leading side edge and the trailing side edge of the sipe, at least one end of the sipe communicating with the auxiliary groove, one end of the chamfered portion adjacent to the auxiliary groove in the rib communicating with the auxiliary groove, a maximum depth x (mm) of the sipe and a maximum depth y (mm) of the chamfered portion satisfying x×0.1≤y≤x×0.3+1.0, a sipe width of the sipe being constant in a range from an end positioned in a radial direction inside the chamfered portion to a groove bottom of the sipe, and the sipe including only one chamfered portion and only one non-chamfered portion on the leading side edge and only one chamfered portion and only one non-chamfered portion on the trailing side edge; wherein
the chamfered portion formed in the leading side edge has a different length in the tire width direction than the chamfered portion formed in the trailing side edge;
a length of the auxiliary groove in the tire width direction is less than a shortest length in the tire width direction of the chamfered portion formed in the leading side edge and the chamfered portion formed in the trailing side edge; and the auxiliary groove width is equal to a combined width of the sipe and width of the chamfered portion on the leading side edge or on the trailing side edge.

6. The pneumatic tire according to claim 5, wherein the sipe comprises a first end communicating with the auxiliary groove and a second end communicating with another one of the plurality of main grooves.

7. The pneumatic tire according to claim 5, wherein:

the auxiliary groove is a first auxiliary groove communicating with the one of the plurality of main grooves;

a second auxiliary groove communicates with another one of the plurality of main grooves; and at least one other end of the sipe communicates with the second auxiliary groove.

* * * * *